US012659345B1

(12) United States Patent
　　Aboukhadijeh et al.

(10) Patent No.:　US 12,659,345 B1
(45) Date of Patent:　Jun. 16, 2026

(54) LEVERAGING GENERATIVE ARTIFICIAL INTELLIGENCE TO IDENTIFY AND VERIFY VULNERABILITY PATTERNS WITHIN VULNERABLE DEPENDENCIES

(71) Applicant: Socket, Inc., Wilmington, DE (US)

(72) Inventors: Feross Hassan Aboukhadijeh, San Francisco, CA (US); Benjamin Barslev Nielsen, Aarhus (DK); Mikola Christopher Lysenko, Midland, MI (US); Martin Torp, Aarhus (DK)

(73) Assignee: Socket, Inc., Wilmington, DE (US)

( * ) Notice: Subject to any disclaimer, the term of this patent is extended or adjusted under 35 U.S.C. 154(b) by 0 days.

(21) Appl. No.: 19/409,703

(22) Filed: Dec. 4, 2025

Related U.S. Application Data

(60) Provisional application No. 63/884,017, filed on Sep. 18, 2025, provisional application No. 63/869,804, filed on Aug. 25, 2025, provisional application No. 63/818,506, filed on Jun. 5, 2025.

(51) Int. Cl.
　　*H04L 29/06*　　　(2006.01)
　　*H04L 9/40*　　　(2022.01)
　　*H04L 41/16*　　　(2022.01)
(52) U.S. Cl.
　　CPC .......... *H04L 63/1433* (2013.01); *H04L 41/16* (2013.01)
(58) Field of Classification Search
　　None
　　See application file for complete search history.

(56) References Cited

U.S. PATENT DOCUMENTS

| | | | |
|---|---|---|---|
| 11,770,398 B1 * | 9/2023 | Erlingsson .......... | G06F 16/3329 |
| | | | 709/224 |
| 11,973,784 B1 * | 4/2024 | Erlingsson ............ | G06F 9/5077 |
| 12,058,160 B1 * | 8/2024 | Erlingsson ............ | G06F 16/906 |
| 12,095,796 B1 * | 9/2024 | Godefroid .............. | G06F 9/542 |
| 12,267,345 B1 * | 4/2025 | Erlingsson ............ | G06F 9/5072 |
| 12,348,545 B1 * | 7/2025 | Parikh ..................... | G06F 9/455 |
| 12,355,626 B1 * | 7/2025 | Varakantam .......... | H04L 67/535 |

(Continued)

OTHER PUBLICATIONS

Lin, Guanjun et al. Software Vulnerability Detection Using Deep Neural Networks: A Survey. Proceedings of the IEEE, vol. 108, Issue: 10. https://ieeexplore.ieee.org/stamp/stamp.jsp?tp=&arnumber=9108283 (Year: 2020).*

(Continued)

*Primary Examiner* — Jeremiah L Avery
(74) *Attorney, Agent, or Firm* — Fenwick & West LLP

(57)　　　　　　ABSTRACT

In some embodiments, a tool receives a vulnerability alert, and inputs the vulnerability alert and associated code from a software package into a generative artificial intelligence model, the model primed to receive a given vulnerability alert and identify a location within the associated code having a given vulnerability pattern. The tool receives, as output from the model, a vulnerability pattern within a subset of the associated code and an explanation of why the vulnerability pattern matches the vulnerability alert. The tool performs a secondary verification that the vulnerability pattern matches the vulnerability alert, and, responsive to success of the secondary verification, performs a reachability analysis of the vulnerability pattern with respect to an application having the software package as a dependency.

20 Claims, 8 Drawing Sheets

(56) References Cited

U.S. PATENT DOCUMENTS

| | | | | |
|---|---|---|---|---|
| 12,363,156 | B1 * | 7/2025 | Thompson | H04L 9/3213 |
| 12,418,555 | B1 * | 9/2025 | Skarphedinsson | |
| | | | | G06F 9/45533 |
| 12,489,771 | B1 * | 12/2025 | Erlingsson | G06F 9/5072 |
| 12,495,052 | B1 * | 12/2025 | Godefroid | G06F 16/9024 |
| 2017/0214701 | A1 * | 7/2017 | Hasan | H04L 63/1433 |
| 2021/0021644 | A1 * | 1/2021 | Crabtree | H04L 63/1433 |
| 2022/0210202 | A1 * | 6/2022 | Crabtree | G06F 21/577 |
| 2022/0405397 | A1 * | 12/2022 | Golan | G06F 21/57 |
| 2023/0009127 | A1 * | 1/2023 | Boyer | H04L 41/16 |
| 2023/0164158 | A1 * | 5/2023 | Fellows | H04L 63/1425 |
| | | | | 726/23 |
| 2024/0414190 | A1 * | 12/2024 | Lal | H04L 63/1416 |
| 2025/0030725 | A1 * | 1/2025 | Fellows | H04L 63/1433 |
| 2025/0039196 | A1 * | 1/2025 | Crabtree | H04L 43/028 |
| 2025/0063063 | A1 * | 2/2025 | Tishbi | G06F 16/9024 |
| 2025/0117486 | A1 * | 4/2025 | Pickman | H04L 63/1433 |
| 2025/0175456 | A1 * | 5/2025 | Crabtree | G06F 16/909 |
| 2025/0233884 | A1 * | 7/2025 | Sherr Lurie | G06F 21/577 |
| 2025/0247413 | A1 * | 7/2025 | Sharma | H04L 63/1433 |
| 2025/0247414 | A1 * | 7/2025 | Baragaba | H04L 63/1433 |
| 2025/0258951 | A1 * | 8/2025 | Thompson | G06F 21/6218 |
| 2025/0265336 | A1 * | 8/2025 | McKey | G06F 21/57 |
| 2025/0310367 | A1 * | 10/2025 | du Preez | H04L 63/1425 |
| 2026/0050935 | A1 * | 2/2026 | Kase | G06Q 30/0185 |

OTHER PUBLICATIONS

Watson, Anne et al. Detecting Software Code Vulnerabilities Using 2D Convolutional Neural Networks with Program Slicing Feature Maps. 2022 IEEE Applied Imagery Pattern Recognition Workshop (AIPR). https://ieeexplore.ieee.org/stamp/stamp.jsp?tp=&arnumber=10092211 (Year: 2022).*

Andrade, Roberto et al. Adaptive Abstraction with AI for Managing Software Antipatterns Throughout the Software Lifecycle. : 2025 IEEE/ACM International Workshop on Designing Software (Designing). https://ieeexplore.ieee.org/stamp/stamp.jsp?tp=&arnumber=11029566 (Year: 2025).*

* cited by examiner

<u>100</u>

400

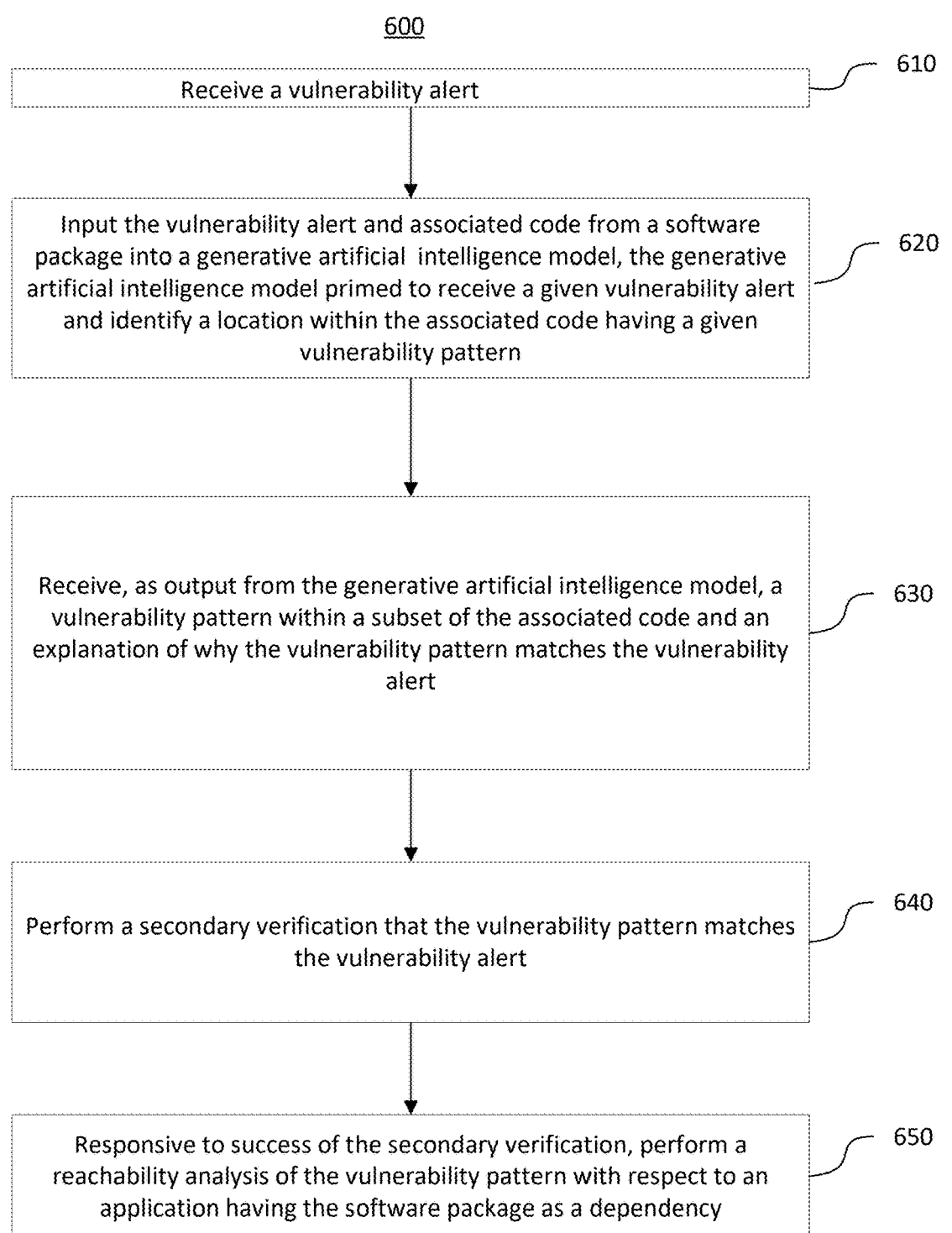

600

Receive a vulnerability alert — 610

Input the vulnerability alert and associated code from a software package into a generative artificial intelligence model, the generative artificial intelligence model primed to receive a given vulnerability alert and identify a location within the associated code having a given vulnerability pattern — 620

Receive, as output from the generative artificial intelligence model, a vulnerability pattern within a subset of the associated code and an explanation of why the vulnerability pattern matches the vulnerability alert — 630

Perform a secondary verification that the vulnerability pattern matches the vulnerability alert — 640

Responsive to success of the secondary verification, perform a reachability analysis of the vulnerability pattern with respect to an application having the software package as a dependency — 650

FIG. 6

LEVERAGING GENERATIVE ARTIFICIAL INTELLIGENCE TO IDENTIFY AND VERIFY VULNERABILITY PATTERNS WITHIN VULNERABLE DEPENDENCIES

CROSS REFERENCE TO RELATED APPLICATIONS

This application claims the benefit of U.S. Provisional Application No. 63/884,017, filed on Sep. 18, 2025, the benefit of U.S. Provisional Application No. 63/869,804, filed on Aug. 25, 2025, and the benefit of U.S. Provisional Application No. 63/818,506, filed on Jun. 5, 2025, each of which are incorporated by reference in their entireties.

BACKGROUND

Modern software applications increasingly rely on complex dependency chains, often involving third-party libraries. While theses dependencies accelerate software development, they also introduce potential security risks. Vulnerabilities in any part of the dependency chain can expose an application to exploitation.

Existing vulnerability assessment approaches, such as systems based on common vulnerabilities and exposures (CVE) databases, rely on scanning dependency graphs for a software package to identify known vulnerabilities across the entire graph. However, such systems are often computationally expensive and likely to generate false positives, particularly when flagged vulnerabilities are not reachable in the application execution path and therefore do not render a software package vulnerable. Moreover, these approaches analyze entire dependency graphs, where hundreds, thousands, or more of dependencies may exist and require scanning. Performing such extensive scanning is computationally intense and may not even be feasible using a cloud provider given the amount of latency required. Current approaches for such large and inefficient scans require scanning applications to be installed on-premises, where compute is consumed from client resources and large amounts of client memory is required to be allocated for the task, thereby rendering monitoring from a security provider over a network ineffective, and creating limitations (e.g., dynamic update limitations and others) imposed by an entirely on-premises solution.

CVE alerts (and similar) are not always accurate, sometimes due to erroneous information, and sometimes due to overbreadth of information (e.g., a software package is labeled as vulnerable, but only some versions of that software package are vulnerable while others are not). Inaccuracies in alerts may cause intervention tools to burn unnecessary compute and latency in attempting to perform interventions to address phantom vulnerabilities, and may cause erroneous patching that unnecessarily disturbs developer code without addressing any vulnerability. Moreover, CVE alerts may not particularly indicate what portions of a software package dependency cause a vulnerability, causing interventions to be overbroad and impact developer code where no vulnerability exists.

SUMMARY

Systems and methods are disclosed herein that improve software vulnerability management by introducing precomputed reachability analysis techniques that dynamically determine whether a vulnerability is reachable by the application at runtime. Combined with boundary-based pruning, the system prunes unreachable dependency chains, which isolates for vulnerability scanning only those components of the dependency graph that are connected through executable paths. This approach filters out unreachable dependencies and improves vulnerability detection by minimizing compute and latency for vulnerability scanning (and subsequent intervention where vulnerabilities are found). Moreover, this approach enables a cloud service to be used for vulnerability scanning given the reduced amount of compute required to scan a pruned graph, improving network and computational efficiency and freeing up client-side resources for other tasks.

In some embodiments, the system maintains a knowledge graph that captures a full dependency structure of an application as a dependency chain. Upon discovery of a new vulnerability, the system performs a backward chain analysis to trace how a vulnerability may be reached within the application. The system draws a boundary that segregates unreachable nodes from the dependency graph and performs vulnerability analysis only on reachable nodes. In some embodiments, the graph is pruned at the boundary and stored for usage as vulnerable node alerts (e.g., CVEs) are received, also reducing compute by avoiding a need to re-determine reachability on an ongoing basis unless a dependency graph is updated. This allows the system to enhance scalability, reduces computational overhead, and improves in vulnerability detection by focusing analysis only on reachable and potentially exploitable components.

In some embodiments, the system leverages generative artificial intelligence to identify sub-portions of a vulnerable code that include vulnerability patterns matching a CVE alert, and to verify that the vulnerable code actually is vulnerable. The system may additionally verify which versions of a software package include the vulnerability patterns, and annotate those versions as vulnerable while annotating other versions as not vulnerable. This ensures that interventions are only applied where vulnerabilities actually exist, and limits analysis only to versions that include the vulnerability, thereby avoiding waste of network latency and compute on software package analysis that do not actually have vulnerable code.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 6 is an exemplary flowchart showing a process for verifying that a software package is actually vulnerable before initiating a reachability analysis, in accordance with an embodiment.

DETAILED DESCRIPTION

The FIGURES (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
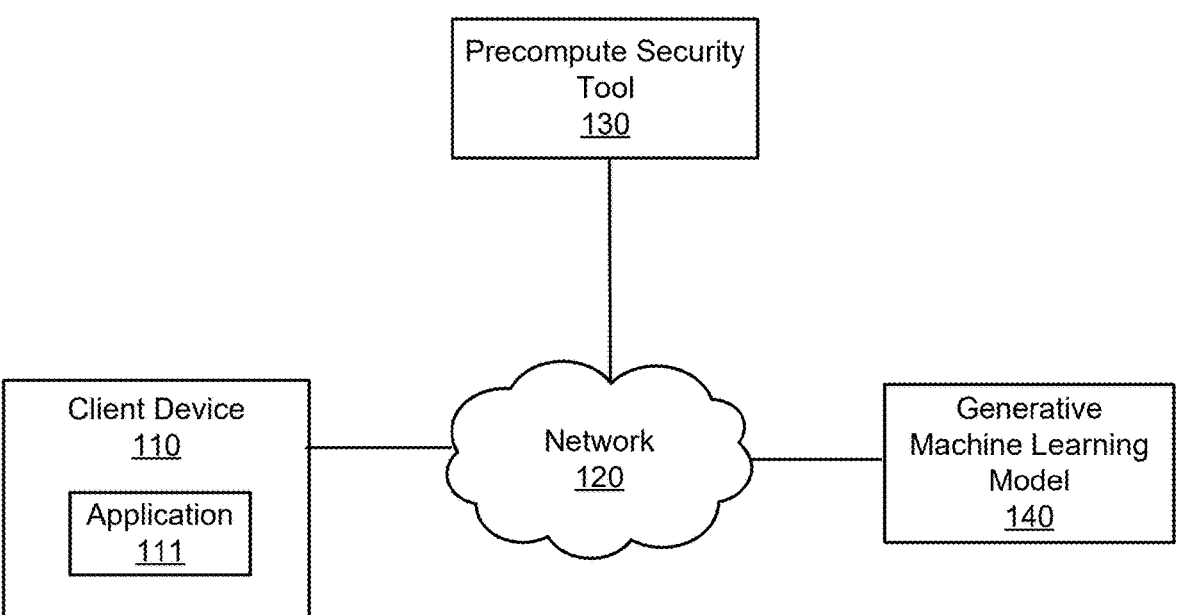
FIG. 1 illustrates one embodiment of a system environment for implementing a precompute security tool.

FIG. 1 illustrates one embodiment of a system environment for implementing a search tool. As depicted in FIG. 1, environment 100 includes various devices, including client device 110, network 120, precompute security tool 130, and generative machine learning model 140. A tool, as used herein, is a collection of one or more cloud resources that together, perhaps in coordination with other entities such as application 111, form a client-facing tool.

Client device 110 may be used by an end user in connection with creating the application, updating the application, and/or requesting scanning of the application. Inclusion of client device 110 is optional; an application may be subscribed for scanning on an ongoing basis. In some embodiments, client device 110 may request that precompute security tool 130 pre-analyze dependency data. This pre-analysis may occur in order to determine a dependency chain and store the dependency chain in a knowledge graph. In some embodiments, precompute security tool 130 may automatically (e.g., without a request from client device 110) pre-analyze the dependency data.

Optionally, client device 110 may have application 111 installed thereon. Application 111 may provide interface between client device 110 and precompute security tool 130. Application 111 may be a stand-alone application installed on client device 110, or may be accessed by way of a secondary application, such as a browser application. Any activity described herein with respect to precompute security tool 130 may be performed wholly or in part (e.g., by distributed processing) by application 111. That is, while activity is primarily described as performed in the cloud by precompute security tool 130, this is merely for convenience, and all of the same activity may be performed wholly or partially locally to client device 110 by application 111.

Network 120 facilitates transmission of data between client device 110, CVEs patch tool 130, and large language model 140, as well as any other entity with which any entity of environment 100 communicates. Network 120 may be any data conduit, including the Internet, short-range communications, a local area network, wireless communication, cell tower-based communications, or any other communications.

Precompute security tool 130 is used to pre-analyze dependency data (e.g., static dependency data or dynamic dependency data) and optimize vulnerability detection at runtime by limiting vulnerability analysis to reachable vulnerable nodes. Precompute security tool 130 preprocesses application packages and their dependency chains to generate metadata that captures how vulnerable dependencies might be reached. The dependency chain herein refers to the sequence of software packages, both direct and transitive, that an application relies on to function, where any given package may depend on one or more other packages. In other words, when a software package executes a given package to work, that given package may in turn use one or more other packages (e.g., dependencies), forming a network of interconnected software components. As used herein, the term vulnerability may refer to a known or newly disclosed security risk associated with one or more of these packages, which are typically identified through external sources (e.g., a CVE database). Further details regarding activity of precompute security tool 130 are described with respect to FIGS. 2-4 below.

Precompute Security Tool Particulars

Figure 2:
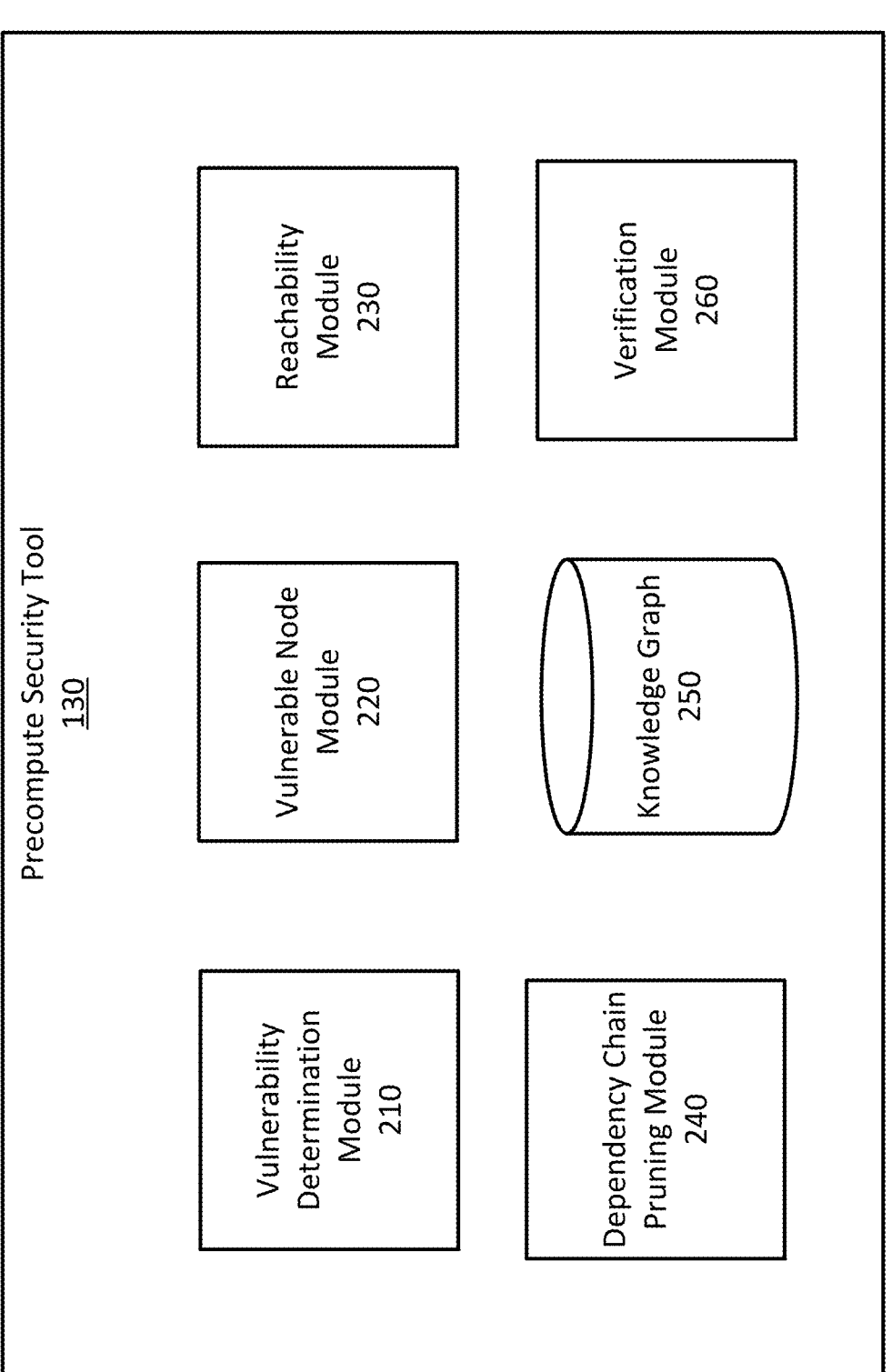
FIG. 2 illustrates exemplary modules and databases of the precompute security tool, in accordance with an embodiment.

FIG. 2 illustrates exemplary modules and databases of the precompute security tool, in accordance with an embodiment. As depicted in FIG. 2, precompute security tool 130 includes vulnerability determination module 210, vulnerable node module 220, reachability module 230, dependency chain pruning module 240, knowledge graph 250, and verification module 260. The modules and databases depicted in FIG. 2 are merely exemplary, and fewer or more modules and/or databases may be used by precompute security tool 130 to achieve the functionality disclosed herein.

Vulnerability determination module 210 may obtain an alert of a vulnerability within an application. In some embodiments, the alert may be a Common Vulnerabilities and Exposures (CVE) alert that is associated with the vulnerability. The alert may be pushed to vulnerability determination module 210 upon detection by a CVE database, or may be obtained based on vulnerability determination module 210 polling the CVE database for alerts of new vulnerabilities (e.g., periodically, a-periodically, or on some other cadence). References to CVE databases herein are merely representative; wherever CVEs are mentioned, other data repositories of vulnerabilities may equally apply as additional and/or alternative sources of vulnerability information.

Precompute security tool 130 may determine reachable dependencies using vulnerabilities determined using vulnerability determination module 210. Precompute security tool may initiate reachable dependency determinations responsive to receiving a request from a user of client device 110 to pre-compute reachable dependencies for an application, and/or may initiate reachable dependency determinations responsive to detecting a Common Vulnerabilities and Exposures (CVE) alert for a new vulnerability.

Vulnerable node module 220 may determine a dependency chain for an application, and may store a representation of the dependency chain in knowledge graph 250. The dependency chain may include nodes each representing a package used by the application, and edges connecting the nodes where there is a dependency by an upstream node on a downstream node within the dependency chain. The edges may be directed edges, the direction representing the dependency. In some embodiments, vulnerable node module 220 may determine the dependency chain dynamically (e.g., at runtime; upon request by application 111). In other embodiments, vulnerable node module 220 may determine pre-compute the dependency chain (e.g., in due course; at a first time an application is run; at a time an application is updated; in response to a request from application 111; or at any other time) and store the dependency chain for use in reachability analyses in the future.

Vulnerable node module 220 determines, from the dependency chain, which nodes are vulnerable, based on alerts obtained by vulnerability determination module 210. In order to analyze the dependency chain to form this determination of which nodes are vulnerable, the representation of the dependency chain may be formed as a dependency graph, each node in the graph representing a software package, with edges between nodes indicating dependency relationships. The graph maps a structural foundation for tracking how data and code execution flow through the application software stack. This enables accurate understanding of how vulnerabilities can propagate through various components, including external dependencies. The graph may be updated and maintained as dependencies change in new versions of a package. Manners of determining and maintaining a dependency graph are discussed in commonly owned U.S. patent application Ser. No. 18/118, 699, titled, "Detecting Suspected Malware in Open Source Dependencies," filed Mar. 7, 2023, to be granted on May 27, 2025 as U.S. Pat. No. 12,314,394, the disclosure of which is hereby incorporated by reference herein in its entirety. In some embodiments, this may be a directed graph, where directed edges are used between nodes to show direction of dependency. Using the dependency graph, precompute security tool 130 defines a set of potentially vulnerable nodes within the dependency graph that correspond to software packages associated with known vulnerabilities (obtained by vulnerability determination module 210).

Reachability module 230 leverages the dependency graph to determine whether nodes of the set of potentially vulnerable nodes are reachable by the application. The term "leaf node," as used herein, refers to a node that is identified for a backward traversal reachability analysis. These leaf nodes need not be a true leaf of a tree—the leaf nodes may themselves have downstream dependencies, but are nonetheless referred to as leaf nodes because they are identified as vulnerable nodes that are to be used as a starting point for a reachability analysis. Generally, leaf nodes are identified as vulnerable nodes through alerts such as CVEs; however, leaf nodes may be selected through other mechanisms (e.g., manually identified as a leaf node for the purpose of a reachability analysis).

In some embodiments, reachability module 230 performs a backward traversal from each of the vulnerable leaf nodes, tracing upstream through connected packages to determine whether paths could lead to the execution of the vulnerable code. Where no path could lead to execution of the code of the leaf node (e.g., the upstream node does not call the downstream node), the leaf node and upstream nodes that are not reachable may be pruned from the dependency tree by precompute security tool 130. A leaf node may not be reachable because, even though an upstream node has code that purports to call the leaf node (or an interim node between the leaf node and the upstream node), that code is not actually called based on any path of the upstream node instructed to be executed by the application.

In particular, after identifying the leaf nodes that correspond to vulnerable dependencies, for each one of those leaf nodes, reachability module 230 identifies a set of node pairs having a direct link between an upstream node and the vulnerable node. A leaf node may in some cases have multiple direct upstream nodes, each of which have code that could call the leaf node, and a node pair would be established between the leaf node and each of those upstream nodes. The leaf node would be reachable if any upstream node of the set reaches the leaf node. Reachability module 230 determines whether the vulnerable node is reachable by each upstream node of the set of upstream nodes of the node pairs, and responsive to determining that the vulnerable node is not reachable by a respective upstream node of the node pairs, annotates its respective direct link as unreachable (e.g., by updating metadata of or associated with the knowledge graph);

Where an upstream node of the node pairs is reachable, reachability module 230 iteratively performs reachability analysis upstream until a root node is reached. In this way, where there is no path to reach a leaf node, dependency chain pruning module 240 may eliminate portions of the dependency graph that are not relevant to actual execution (e.g., by annotating the leaf node and/or upstream nodes from the leaf node as unreachable). This results in a pruned dependency chain that isolates exploitation paths through which a vulnerability may be reached, filtering out a subset of packages that are not reachable, thereby limiting vulnerability analysis only to reachable packages.

Dependency chain pruning module 240 stores the metadata of the pruned dependency chains, including precomputed graphs and indexed structures. These may be stored to knowledge graph 250. This allows future vulnerability determinations to be executed at runtime, without needing to recompute the full dependency each time a new vulnerability is discovered or each time a software package is run. Especially in software environments with frequent package updates and/or numerous applications sharing dependency structures, the pruning of dependency chains substantially improves efficiency of the system. Using the pruned dependency chains, precompute security tool 130 analyzes reachable dependencies of the application for vulnerabilities. Precompute security tool 130 may determine that reachability may have changed based on a code update that calls a previously unreachable node (e.g., when a new version of the application is released), and may responsively perform an updated reachability analysis. Exemplary and non-limiting examples of a dependency chain and pruning process are described with reference to FIGS. 3A-3C.

In some embodiments, dependency chain pruning module 240 stores the reachable dependencies as a reachable dependency graph in a cache. That is, whatever portions of the dependency chain are pruned are removed from a copy of the dependency chain, and that copy is stored in the cache as a reachable dependency graph in order to rapidly determine vulnerabilities in an application. This ensures that, responsive to a future request to scan the application for vulnerabilities, the reachable dependency graph can be quickly retrieved and used to scan the pruned dependency chain without performing a redetermination of reachability.

In some embodiments, precompute security tool 130 may begin from prior precomputed reachability analysis using a reachability dependency graph when a new vulnerability is detected. In such scenarios, precompute security tool 130 may determine whether the new vulnerability has a corresponding node in the reachability dependency graph, and if so, may determine whether that new vulnerability is reachable. Precompute security tool 130 may prune the graph if the new vulnerability is not reachable to exclude the node.

In some embodiments, verification module 260 may be used prior to deploying a reachability analysis to determine that a vulnerability alert actually corresponds to a vulnerability, in order to ensure that reachability analyses are only performed for vetted vulnerabilities in dependencies. In some embodiments, verification module 260 may be used to determine other versions of a dependency that may include a same vulnerability pattern of a vulnerability, and annotate those other versions with a vulnerability annotation in order to ensure that reachability analyses and interventions may be performed as appropriate. Further details about verification module 260 are discussed below with respect to FIGS. 5-6.

Figure 3A:
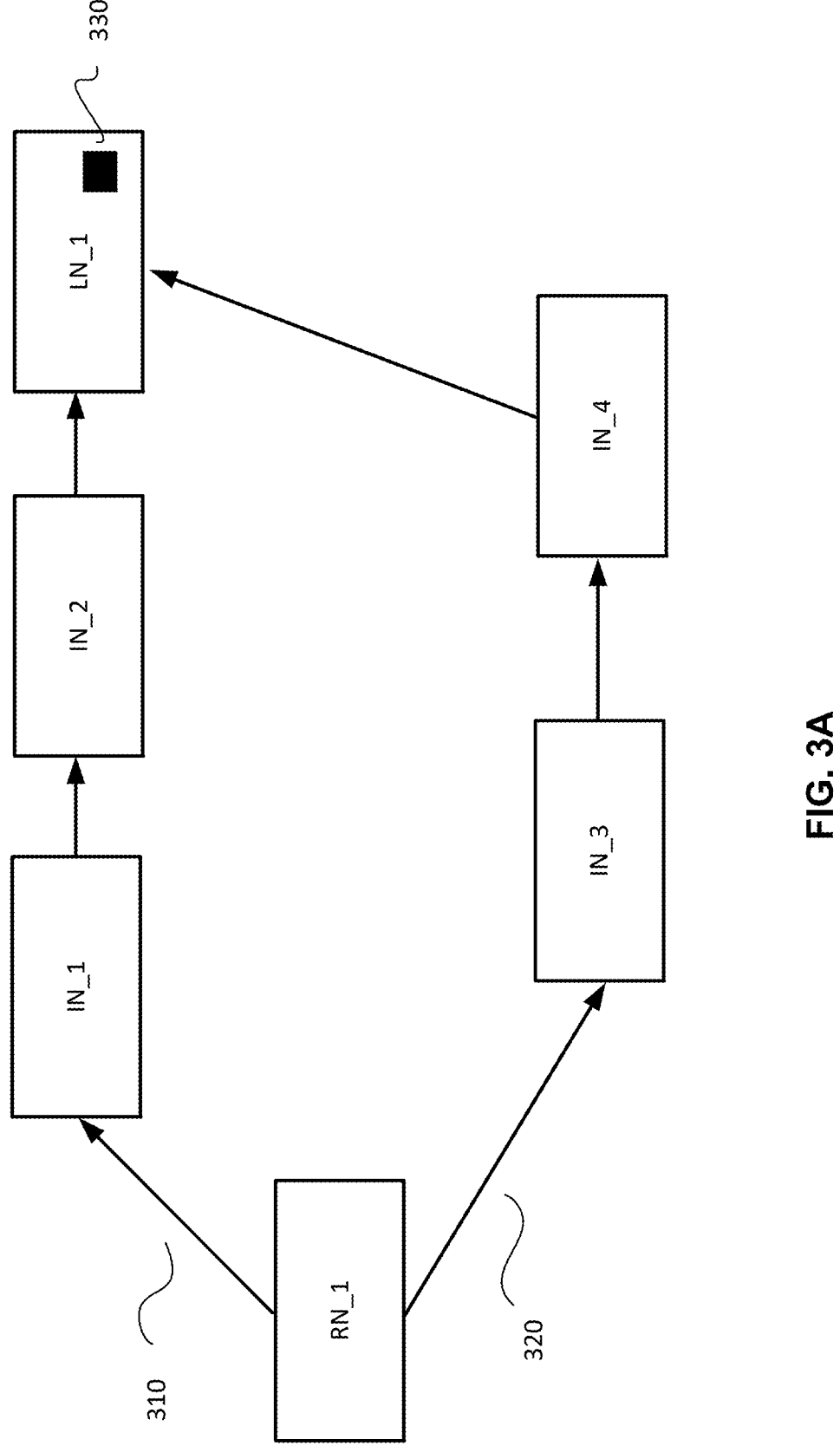
FIG. 3A illustrates an example dependency chain for an application, in accordance with an embodiment.

FIG. 3A illustrates an example dependency chain for an application, in accordance with an embodiment. Dependency chains herein are represented as a graph comprising nodes and edges, where each node corresponds to a software package and each edge represents a dependency relationship between the packages. The graph begins at root node RN_1 as an entry point of the application. Starting from RN_1, there are two primary branches extending to intermediate nodes. The first branch 310 flows through intermediate node IN_1 followed by IN_2 and finishes at leaf node LN_1. The second branch 320 flows through IN_3 and IN_4 also connecting to LN_1, thus forming multiple dependency paths to the same leaf node LN_1. As shown in the FIG. 3A, intermediate nodes IN_1, IN_2, IN_3, and IN_4 represent packages that are not known to be vulnerable but serve as pass points through which a vulnerability may be reached. LN_1 represents a leaf node in the dependency graph, corresponding to a package in which a known and/or a potential vulnerability exists. The vulnerability 330 is shown inside LN_1 as a solid black square to show its vulnerable status.

Figure 3B:
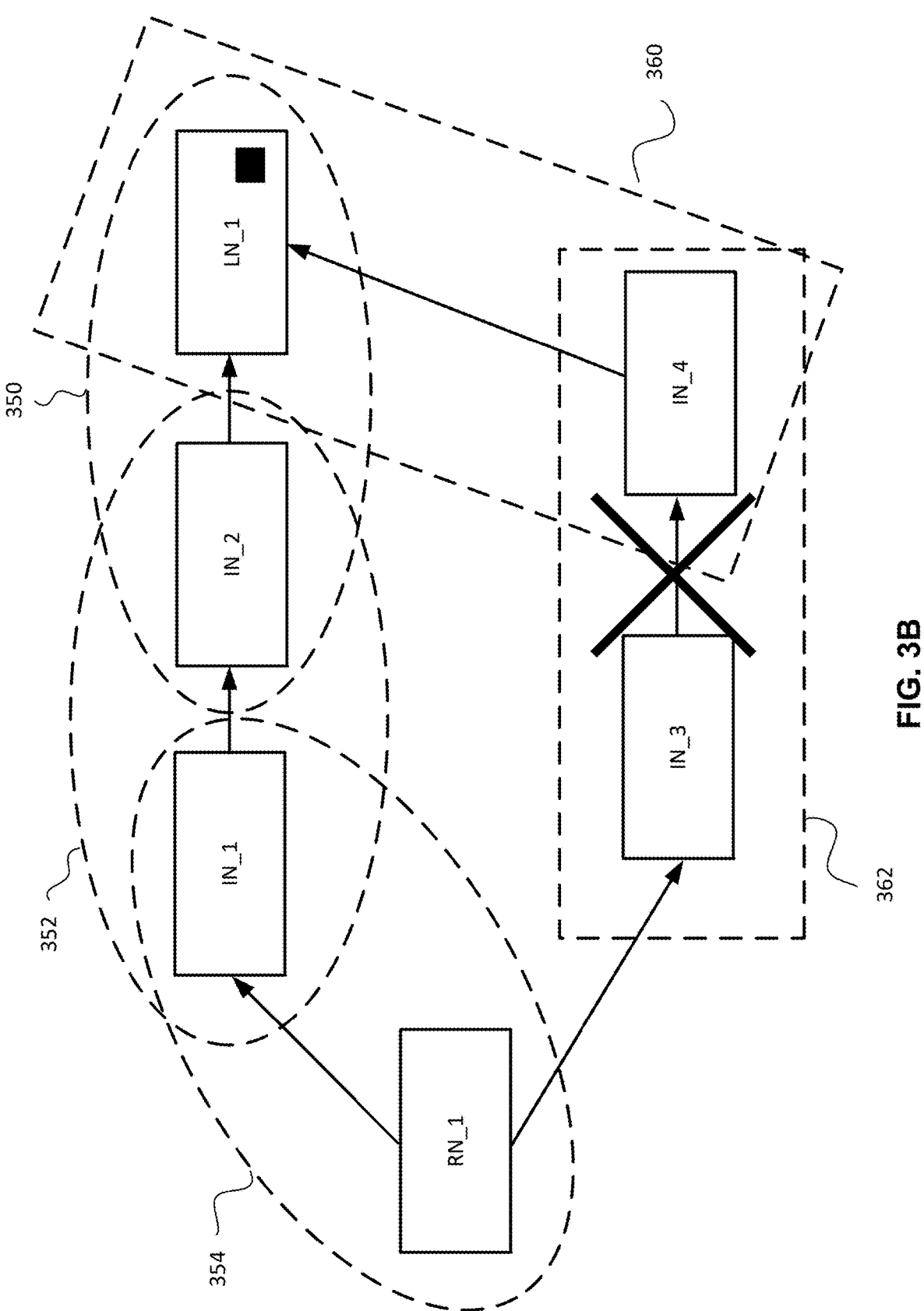
FIGS. 3B and 3C illustrates an example of pairwise reachability analysis of a dependency chain, in accordance with an embodiment.

In one embodiment, dependency chain may be structured as a Directed Acrylic Graph (DAG), where edges from a packaged to corresponding dependencies without forming cycles. This allows precise tracing of how vulnerabilities can be reached with a loop-free path from the root node to any dependency node. Depending on the configuration of the system, other graph structures may also be used for modeling software dependencies FIG. 3B illustrates an example of pair-wise reachability analysis of a dependency chain, in accordance with an embodiment. Upstream-downstream relationships are used to perform reachability analysis. In one embodiment, precompute security tool 130 performs a pair-wise reachability analysis beginning from a target node and traces its upstream dependencies to assess whether there is a feasible execution path that leads to the vulnerable code. If a node in the upstream chain does not execute the downstream code, it is determined for pruning, because it does not contribute to the propagation of the vulnerability.

As shown in FIG. 3B, starting from the vulnerable node LN_1, precompute security tool 130 identifies its immediate upstream nodes IN_2 and IN_4, and continues its back tracing further upstream to nodes IN_1 and IN_3, reaching the root node RN_1. For example, precompute security tool 130 evaluates the pair 350 and determines that IN_2 is reachable to LN_1. Then, precompute security tool 130 confirms the next pair 352, IN_1 and IN_2 is reachable and finally validates reachability of the pair 354. Each pair is examined to verify that the upstream contains a call, reference and/or data flow to the vulnerable part of the downstream node. After reachability is confirmed at each step, the chain continues to be analyzed upstream. In some embodiments, reachability is initially done upstream in pair-wise fashion for LN_1 to IN_2, and responsive to determining that LN_1 Is reachable from IN_2, some or all of an upstream chain is computed together (e.g., IN_1, IN_2, and LN_1 are computed together).

Applying the same method, precompute security tool 130 evaluates another dependency chain starting with pair 360. Precompute security tool 130 determines that IN_4 is reachable to LN_1. The analysis then proceeds to the next upstream node pair 362. Where precompute security tool 130 determines that IN_4 is not reachable from IN_3, the chain is pruned at that point (as indicated by the X).

By identifying and analyzing such dependency graphs, precompute security tool 130 may determine which upstream packages pose the ability to reach a vulnerability and subsequently prune unreachable paths. This enables vulnerability analysis to be limited to only reachable nodes, saving large amounts of compute power. Based on the pair-wise reachability analysis, precompute security tool 130 prunes the dependency graph to remove unreachable vulnerable nodes and defines pruned dependency chains. Each chain includes a subset of the full dependency chain with only those packages and relationships that lie along the valid execution path from the root node. Thus, the pruned dependency chains correspond to a potential exploitation path and excludes any unreachable portions of the graph.

Figure 3C:
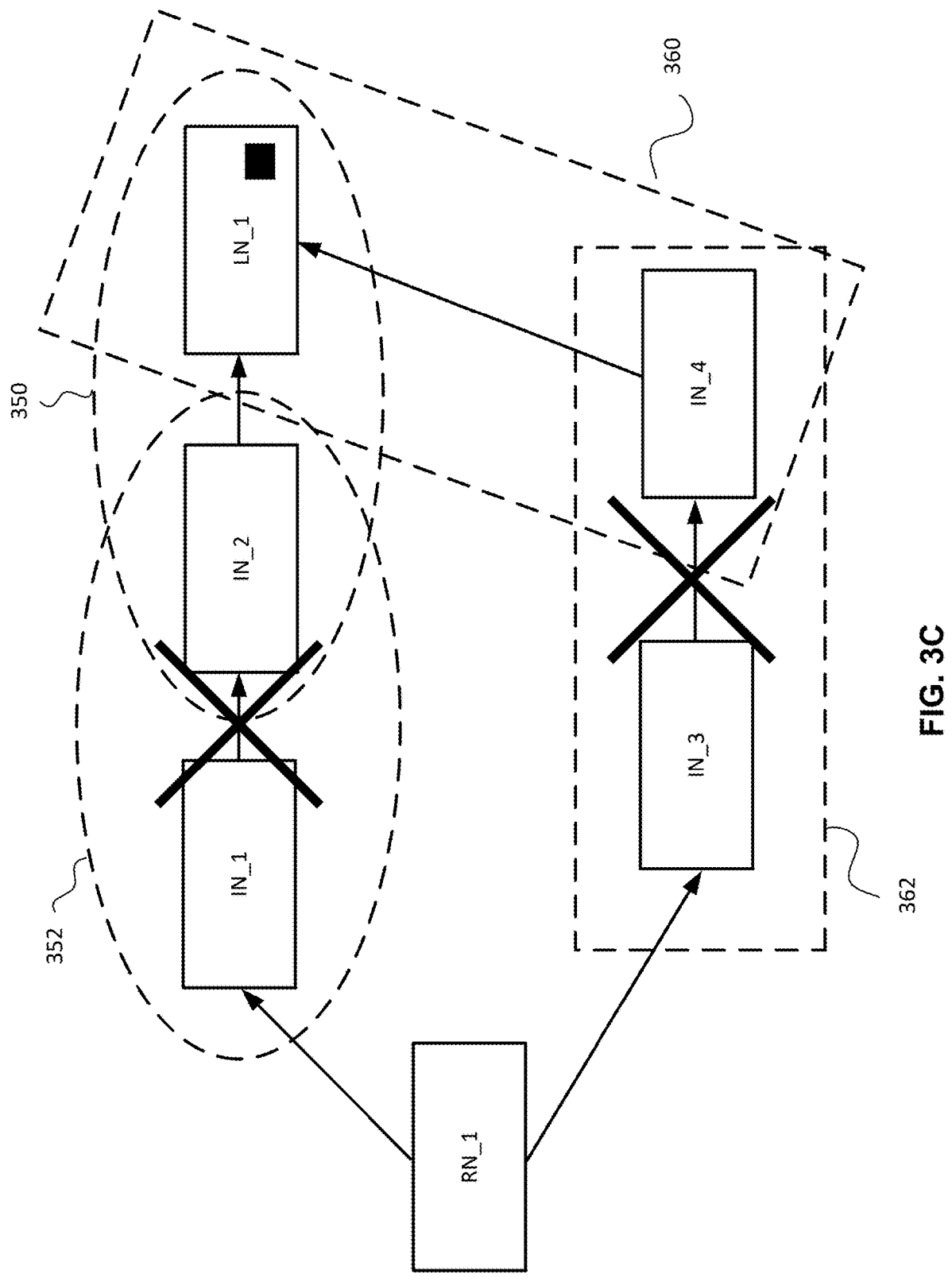

Turning now to FIG. 3C, FIG. 3C is a replica of FIG. 3B, except in this scenario, pair-wise analysis between IN_2 and IN_1 indicates that IN_2 is not reachable from IN_1. In this case, precompute security tool 130 prunes an additional chain (as marked by the X between IN_2 and IN_1). It is now the case that the vulnerable node LN_1 is wholly unreachable by RN_1. Precompute security tool 130 may therefore draw a boundary that excludes RN_1, the boundary drawn through each of the X markings. Given that LN_1 is unreachable, unlike in the scenario of FIG. 3B, precompute security tool 130 will not perform any vulnerability analysis on LN_1, thereby saving compute power on such analysis without compromising on security capabilities, as LN_1 could not be executed by RN_1.

Figure 4:
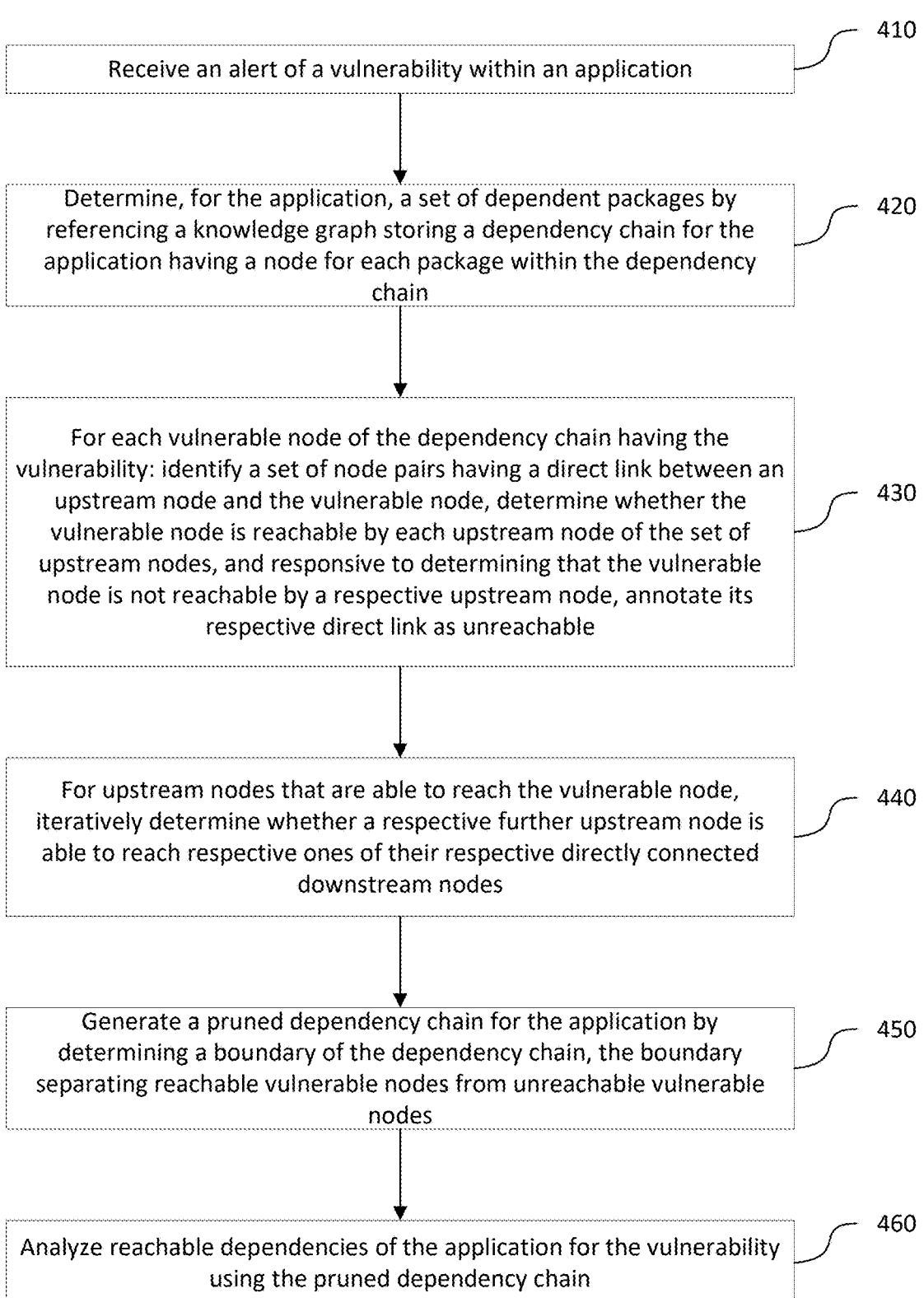
FIG. 4 is an exemplary flowchart showing a process for precomputing a pruned graph of reachable vulnerable nodes, in accordance with an embodiment.

FIG. 4 is an exemplary flowchart showing a process for precomputing a pruned graph of reachable vulnerable nodes, in accordance with an embodiment. Process 400 may be executed by a non-transitory computer-readable medium comprising memory with instructions encoded thereon that, when executed by one or more processors (e.g., using the modules of precompute security tool 130), cause the processor to perform the operations of process 400. Process 400 begins with precompute security tool 130 receiving 410 an alert of a vulnerability within an application (e.g., using vulnerability determination tool 210). Precompute security tool 130 determines 420, for the application, a set of dependent packages by referencing a knowledge graph storing a dependency chain for the application having a node for each package within the dependency chain (e.g., using vulnerable node module 220).

Precompute security tool 130 performs a subroutine 430 for each vulnerable node of the dependency chain having the vulnerability, the subroutine including identifying a set of node pairs having a direct link between an upstream node and the vulnerable node, determining whether the vulnerable node is reachable by each upstream node of the set of upstream nodes; and responsive to determining that the vulnerable node is not reachable by a respective upstream node, annotating its respective direct link as unreachable (e.g., using reachability module 230).

For upstream nodes that are able to reach the vulnerable node, precompute security tool 130 iteratively determines 440 whether a respective further upstream node is able to reach respective ones of their respective directly connected downstream nodes, and generates 450 a pruned dependency chain for the application by determining a boundary of the dependency chain, the boundary separating reachable vulnerable nodes from unreachable vulnerable nodes (e.g., using dependency chain pruning module 250). Precompute security tool 130 analyzes 460 reachable dependencies of the application for the vulnerability using the pruned dependency chain.

In one embodiment, precompute security tool 130 utilizes large language models (LLMs) to enable automated identification and annotation of vulnerabilities within source code of the application. Precompute security tool 130 receives a vulnerability alert, such as a CVE, and applies an LLM trained to identify vulnerable regions in the code that corresponds to the alert. Because vulnerability alerts are often published in unstructured and/or incomplete formats, the tool enhances the alerts by extracting or inferring metadata such as function names, access paths, and relevant code locations. The LLM may analyze both the current version of the codebase and a known fixed version to detect differences that align with the alert description to isolate the impacted code.

The LLM outputs a vulnerability pattern and corresponding explanation that describes how the code matches the characteristics of the vulnerability alert. Further, precompute security tool 130 performs a secondary verification step, which may involve another LLM or a human review verifying. Upon determining that verification is successful, precompute security tool 130 proceeds with a reachability analysis to determine whether the vulnerability is exploitable within the application's execution context. Precompute security tool 130 supports adaptation to different software ecosystems (e.g., Java, Python, and etc.), adjusting prompts and output formats based on conventions of corresponding language.

Verification Module

Figure 5:
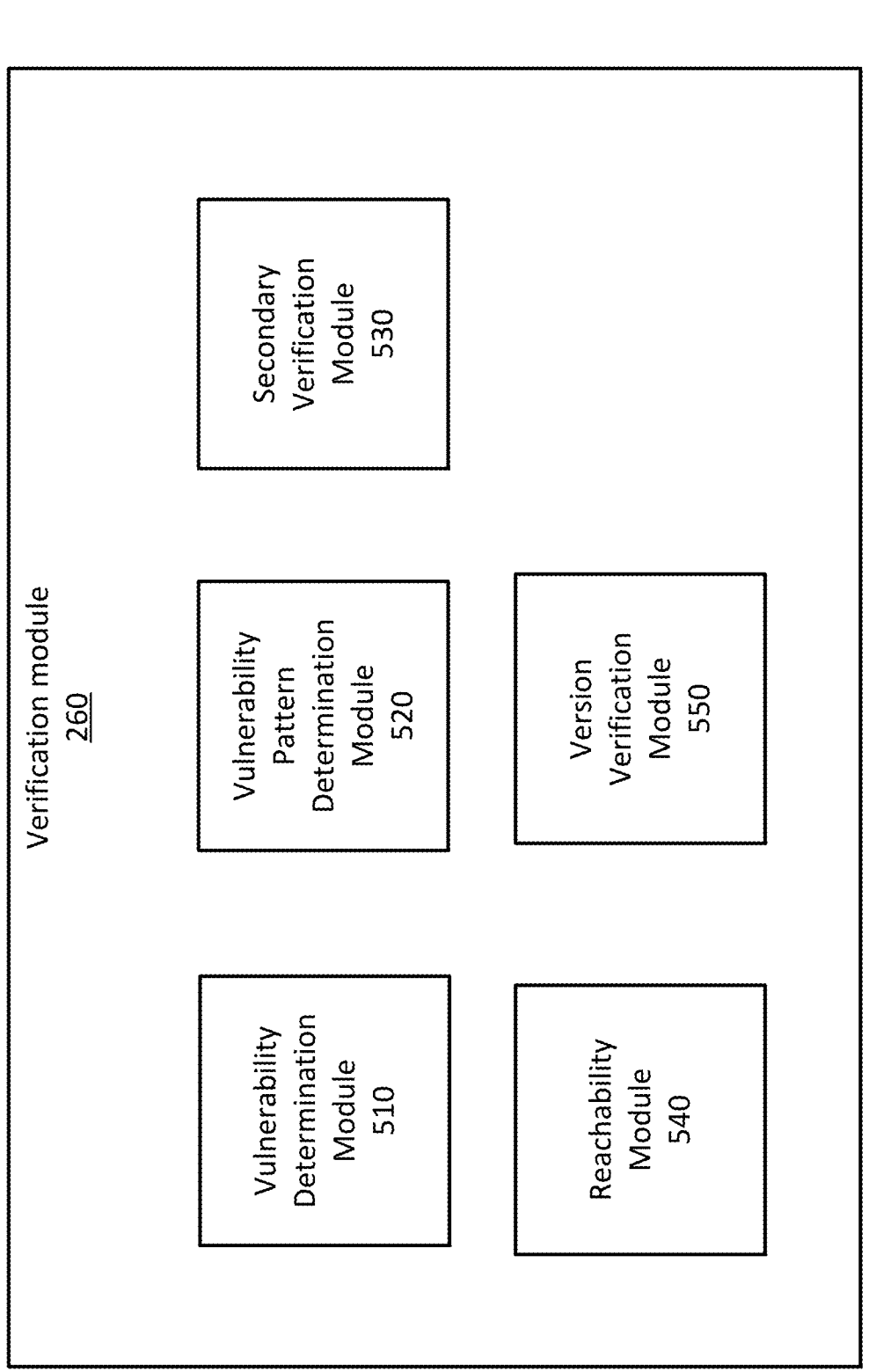
FIG. 5 illustrates exemplary modules and databases of a verification module, in accordance with an embodiment.

FIG. 5 illustrates exemplary modules and databases of a verification module, in accordance with an embodiment. As depicted in FIG. 5, verification module 260 includes vulnerability determination module 510, vulnerability pattern determination module 520, secondary verification module 530, reachability module 540, and version verification module 550. The modules depicted in FIG. 5 are merely exemplary, and fewer or additional modules may be used to achieve the functionality disclosed herein with respect to FIG. 5. Moreover, while verification module 260 is disclosed as part of precompute security tool 130, verification module 260 may be a standalone verification tool separate from precompute security tool 130.

Vulnerability module 510 receives a vulnerability alert. For example, vulnerability module 520 may obtain a CVE alert (e.g., through a subscription for alerts from a CVE database, by polling a CVE database for alerts, or through any other mechanism). In some embodiments, vulnerability module 510 may operate in any manner described with respect to vulnerability determination module 210 in order to receive the vulnerability alert.

Vulnerability pattern determination module 520 inputs the vulnerability alert and associated code from a software package into a generative artificial intelligence model (e.g., generative artificial intelligence model 140). Vulnerability pattern determination module 520 may determine the associated code of the vulnerability alert by accessing code for a dependency corresponding to the vulnerability alert (e.g., from a user's source control repository, from a master copy of the dependency software package, etc.). The generative artificial intelligence model may be primed to receive a given vulnerability alert and identify a location within the associated code having a given vulnerability pattern. For example, the priming may include a provision of context relating to the given vulnerability alert, related to how to identify vulnerability patterns (e.g., generically, for a type of the given vulnerability alert, and/or similar).

Vulnerability pattern determination module 520 receives, as output from the generative artificial intelligence model, a vulnerability pattern within a subset of the associated code and an explanation of why the vulnerability pattern matches the vulnerability alert. The vulnerability pattern may be a portion of the dependency responsible for the vulnerability (e.g., it exposes an attack surface within the dependency where malware may be injected), and other portions of the dependency may not have any association with the vulnerability.

Secondary verification module 530 performs a secondary verification that the vulnerability pattern matches the vulnerability alert. In some embodiments, secondary verification module 530 performs the verification by inputting into a second generative artificial intelligence model the vulnerability pattern and the vulnerability alert, and receiving a response from the second generative artificial intelligence model that confirms or denies that the vulnerability pattern matches the vulnerability alert. Secondary verification model 530 may determine that the secondary verification is successful based on the second generative artificial intelligence model confirming that the vulnerability pattern matches the vulnerability alert. The second generative artificial intelligence model may be the same generative artificial intelligence model used for initial determination of the vulnerability pattern (e.g., potentially primed with different context for verification rather than initial generation of a vulnerability pattern). Alternatively or additionally, the second generative artificial intelligence model may be a different model.

In some embodiments, secondary verification model 530 may perform the secondary verification by prompting a user (e.g., a user of client device 110 and/or an administrator of precompute security tool 130) to verify that the vulnerability pattern matches the vulnerability alert. Secondary verification module 530 may determine that, responsive to receiving input by the user that verifies that the vulnerability pattern matches the vulnerability alert, the vulnerability pattern matches the vulnerability alert. Similarly, responsive to receiving input by the user that verifies that the vulnerability pattern does not match the vulnerability alert, secondary verification module 530 may determine that the vulnerability pattern does not match the vulnerability alert.

In some embodiments, responsive to determining that the vulnerability pattern does not match the vulnerability alert, secondary verification module 530 may prompt the generative AI model with an explanation as to why it does not match (e.g., generated by the secondary model and/or by a user), and prompt the generative AI model to again attempt to identify the vulnerability pattern based on the explanation. This process may iteratively loop between secondary verification module 530 and vulnerability pattern determination module 520 until a matching vulnerability pattern is identified.

In some embodiments, responsive to success of the secondary verification, reachability module 540 performs a reachability analysis of the vulnerability pattern with respect to an application having the software package as a dependency. The reachability analysis may include, for example, whether the associated code would be executed at runtime by the application. In some embodiments, precompute reachability tool 130 may, responsive to determining that the associated code would be executed at runtime by an application, perform an intervention with respect to the dependency (e.g., attempting to patch the dependency, disabling the dependency, alerting an administrator, etc.). In some embodiments, responsive to determining that the associated code would not be executed at runtime by the application, reachability module 540 may refrain from attempting to patch the dependency. Reachability module 540 may take any action disclosed in the foregoing with respect to activity described with respect to FIG. 2, including that described with respect to reachability module 230, dependency chain pruning module 240, knowledge graph 250, and other description with respect to FIG. 2.

Verification module 260 determines whether other versions of a vulnerable software package are vulnerable from a same vulnerability pattern. That is, because alerts such as CVE alerts may be inaccurate or overbroad, verification module 260 may be used as a safeguard to ensure that the vulnerability is only noted for those versions that share a same vulnerability pattern that is associated with a vulnerability alert. Verification module 260 may be used instead of, or in addition to, reachability module 540. That is, responsive to vulnerability pattern determination and/or secondary verification, verification module 260 may be deployed in a standalone system to annotate versions that share the vulnerability (e.g., where reachability need not be performed or may be performed by a secondary system).

Verification module 260 determines, for a software package that is a vulnerable dependency, other versions of the software package. Verification module 260 may determine whether the other versions of the software package include the vulnerability pattern. This may be performed by first identifying the other versions (e.g., using an index pointing to each version of the software package). Verification module 260 may then deploy a matching algorithm, such as prompting an LLM to determine whether the same vulnerability pattern is in any of the other versions, or by using a fuzzy matching algorithm to identify patterns that at least match the vulnerability pattern within a threshold tolerance.

Responsive to determining that the other versions of the software package include the vulnerability pattern, verification module 260 may annotate those versions as vulnerable (and may similarly annotate non-matching versions as not vulnerable). In some embodiments, verification module 260 may trigger a reachability analysis (e.g., performed by reachability module 540) for a given application that deploys one or more of the other versions, where a reachability analysis is not performed for non-vulnerable versions.

FIG. 6 is an exemplary flowchart showing a process for verifying that a software package is actually vulnerable before initiating a reachability analysis, in accordance with an embodiment. Process 600 may be executed by a non-transitory computer-readable medium comprising memory with instructions encoded thereon that, when executed by one or more processors (e.g., using the modules of precompute security tool 130), cause the one or more processors to perform the operations of process 600. Process 400 begins with verification module 260 receiving 610 a vulnerability alert (e.g., using vulnerability detection module 510). Verification module 260 inputs 620 the vulnerability alert and associated code from a software package into a generative artificial intelligence model (e.g., generative machine learning model 140), the generative artificial intelligence model primed to receive a given vulnerability alert and identify a location within the associated code having a given vulnerability pattern (e.g., using vulnerability pattern detection module 520).

Verification module 260 receives 630, as output from the generative artificial intelligence model, a vulnerability pattern within a subset of the associated code and an explanation of why the vulnerability pattern matches the vulnerability alert. Verification module 260 performs 640 a secondary verification that the vulnerability pattern matches the vulnerability alert (e.g., using secondary verification module 530). Responsive to success of the secondary verification, verification module 260 performs 650 a reachability analysis of the vulnerability pattern with respect to an application having the software package as a dependency (e.g., using reachability module 540).

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving a vulnerability alert;
inputting the vulnerability alert and associated code from a software package into a generative artificial intelligence model, the generative artificial intelligence model primed to receive a given vulnerability alert and identify a location within the associated code having a given vulnerability pattern;
receiving, as output from the generative artificial intelligence model, a vulnerability pattern within a subset of the associated code and an explanation of why the vulnerability pattern matches the vulnerability alert;
performing a secondary verification that the vulnerability pattern matches the vulnerability alert; and
responsive to success of the secondary verification, performing a reachability analysis of the vulnerability pattern with respect to an application having the software package as a dependency.

2. The method of claim 1, wherein receiving the vulnerability alert comprises detecting a Common Vulnerabilities and Exposures (CVE) alert that is associated with the vulnerability.

3. The method of claim 1, further comprising determining the associated code of the vulnerability alert by accessing code for a dependency corresponding to the vulnerability alert.

4. The method of claim 1, wherein performing the secondary verification that the vulnerability pattern matches the vulnerability alert comprises prompting a user to verify that the vulnerability pattern matches the vulnerability alert, and wherein success of the secondary verification comprises input by the user that verifies that the vulnerability pattern matches the vulnerability alert.

5. The method of claim 3, wherein performing the secondary verification that the vulnerability pattern matches the vulnerability alert comprises:
inputting into a second generative artificial intelligence model the vulnerability pattern and the vulnerability alert; and
determining that the secondary verification is successful based on the second generative artificial intelligence model confirming that the vulnerability pattern matches the vulnerability alert.

6. The method of claim 1, wherein performing the reachability analysis comprises:
determining whether the associated code would be executed at runtime by the application; and
responsive to determining that the associated code would be executed at runtime by an application, attempting to patch the dependency.

7. The method of claim 6, further comprising, responsive to determining that the associated code would not be executed at runtime by the application, refraining from attempting to patch the dependency.

8. The method of claim 1, further comprising:
determining other versions of the software package;
determining whether the other versions of the software package include the vulnerability pattern; and responsive to determining that the other versions of the software package include the vulnerability pattern, annotating the other versions of the software package as vulnerable, thereby triggering a reachability analysis for a given application that deploys one or more of the other versions.

9. The method of claim 8, further comprising:
responsive to determining that the other versions of the software package do not include the vulnerability pattern, annotating the other versions as not vulnerable, thereby avoiding a reachability analysis for a given application that deploys one or more of the other versions.

10. A non-transitory computer-readable medium comprising memory with instructions encoded thereon, the instructions, when executed by one or more processors, causing the one or more processors to perform operations, the instructions comprising instructions to:
receive a vulnerability alert;
input the vulnerability alert and associated code from a software package into a generative artificial intelligence model, the generative artificial intelligence model primed to receive a given vulnerability alert and identify a location within the associated code having a given vulnerability pattern;
receive, as output from the generative artificial intelligence model, a vulnerability pattern within a subset of the associated code and an explanation of why the vulnerability pattern matches the vulnerability alert;
perform a secondary verification that the vulnerability pattern matches the vulnerability alert; and
responsive to success of the secondary verification, perform a reachability analysis of the vulnerability pattern with respect to an application having the software package as a dependency.

11. The non-transitory computer-readable medium of claim 10, wherein the instructions to receive the vulnerability alert comprise instructions to detect a Common Vulnerabilities and Exposures (CVE) alert that is associated with the vulnerability.

12. The non-transitory computer-readable medium of claim 10, the instructions further comprising instructions to determine the associated code of the vulnerability alert by accessing code for a dependency corresponding to the vulnerability alert.

13. The non-transitory computer-readable of claim 10, wherein the instructions to perform the secondary verification that the vulnerability pattern matches the vulnerability alert comprise instructions to prompt a user to verify that the vulnerability pattern matches the vulnerability alert, and wherein success of the secondary verification comprises input by the user that verifies that the vulnerability pattern matches the vulnerability alert.

14. The non-transitory computer-readable medium of claim 13, wherein the instructions to perform the secondary verification that the vulnerability pattern matches the vulnerability alert comprise instructions to:
input into a second generative artificial intelligence model the vulnerability pattern and the vulnerability alert; and
determine that the secondary verification is successful based on the second generative artificial intelligence model confirming that the vulnerability pattern matches the vulnerability alert.

15. The non-transitory computer-readable medium of claim 10, wherein performing the reachability analysis comprises:

determining whether the associated code would be executed at runtime by the application; and responsive to determining that the associated code would be executed at runtime by an application, attempting to patch the dependency.

16. The non-transitory computer-readable medium of claim 15, the instructions further comprising instructions to, responsive to determining that the associated code would not be executed at runtime by the application, refrain from attempting to patch the dependency.

17. The non-transitory computer-readable medium of claim 10, the instructions further comprising instructions to:

determine other versions of the software package;

determine whether the other versions of the software package include the vulnerability pattern; and responsive to determining that the other versions of the software package include the vulnerability pattern, annotate the other versions of the software package as vulnerable, thereby triggering a reachability analysis for a given application that deploys one or more of the other versions.

18. The non-transitory computer-readable medium of claim 17, the instructions further comprising instructions to:

responsive to determining that the other versions of the software package do not include the vulnerability pattern, annotate the other versions as not vulnerable, thereby avoiding a reachability analysis for a given application that deploys one or more of the other versions.

19. A system comprising:

memory with instructions encoded thereon; and one or more processors that, when executing the instructions, are caused to perform operations comprising:

receiving a vulnerability alert;

inputting the vulnerability alert and associated code from a software package into a generative artificial intelligence model, the generative artificial intelligence model primed to receive a given vulnerability alert and identify a location within the associated code having a given vulnerability pattern;

receiving, as output from the generative artificial intelligence model, a vulnerability pattern within a subset of the associated code and an explanation of why the vulnerability pattern matches the vulnerability alert;

performing a secondary verification that the vulnerability pattern matches the vulnerability alert; and responsive to success of the secondary verification, performing a reachability analysis of the vulnerability pattern with respect to an application having the software package as a dependency.

20. The system of claim 19, wherein receiving the vulnerability alert comprises detecting a Common Vulnerabilities and Exposures (CVE) alert that is associated with the vulnerability.

*     *     *     *     *